July 29, 1958 R. L. HASCHE 2,845,335
REGENERATIVE PROCESSES AND APPARATUS
Filed March 20, 1952 4 Sheets-Sheet 1

AIR
HYDROCARBON STEAM
PRODUCT GAS

INVENTOR.
Rudolph L. Hasche
BY
Sewall G. Bronstein

July 29, 1958 R. L. HASCHE 2,845,335
REGENERATIVE PROCESSES AND APPARATUS
Filed March 20, 1952 4 Sheets-Sheet 2

INVENTOR.
Rudolph L. Hasche
BY
ATTORNEY

July 29, 1958 R. L. HASCHE 2,845,335
REGENERATIVE PROCESSES AND APPARATUS
Filed March 20, 1952 4 Sheets-Sheet 3

INVENTOR.
Rudolph L. Hasche
BY
Sewall C Bronstein
ATTORNEY.

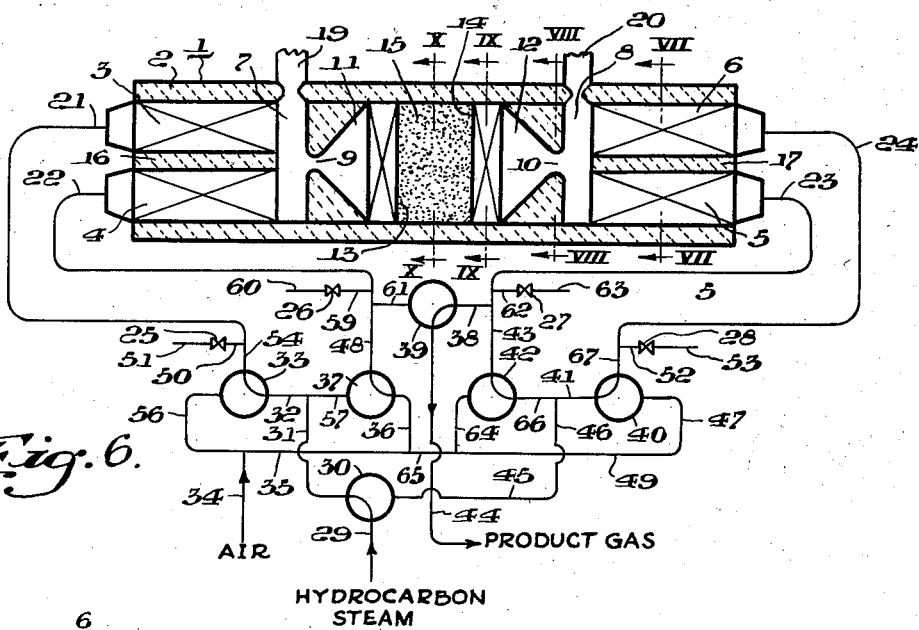

United States Patent Office 2,845,335
Patented July 29, 1958

2,845,335
REGENERATIVE PROCESSES AND APPARATUS

Rudolph Leonard Hasche, Johnson City, Tenn., assignor, by mesne assignments, to Koppers Company, Inc., Pittsburgh, Pa., a corporation of Delaware Application March 20, 1952, Serial No. 277,685

9 Claims. (Cl. 23—288)

This invention relates to regenerative, pyrolytic processes and/or apparatus for endothermically and exothermically altering gaseous or vaporous materials catalytically or non-catalytically.

More particularly, the invention relates to regenerative, catalytic and non-catalytic, endothermic and exothermic reaction processes and/or apparatus in which the highest temperature is obtained in a reaction zone communicating between the extremities of regenerative masses.

Still more particularly, the invention relates to such processes and/or apparatus as above wherein the heat required for the endothermic reaction is supplied by the exothermic reaction.

Still more particularly, the invention relates to such processes and/or apparatus as above wherein the exothermic reaction is carried out either alternately or simultaneously with the endothermic reaction in the reaction zone; wherein the reactants and reaction products of the exothermic and endothermic alterations are preheated in separate preheating operations and quenched respectively by flowing the same in contact with regenerative masses; and wherein the flow of endothermic and exothermic reactants and reaction products are changed from one direction to an opposite direction at intervals to allow heat stored in the masses during the quenching of reaction products to be utilized regeneratively for preheating reactants.

Still more particularly, the present invention relates to a partial combustion process and/or apparatus for the catalytic and non-catalytic reforming of combustible gases, particularly hydrocarbon gases wherein substantially all of the heat developed in the process is recovered and wherein the reactants are preheated separately by contact with separate regenerative masses.

It has been found that it is extremely important in such regenerative, pyrolytic, endothermic and exothermic processes that the reactants be continuously preheated by and during contact with regenerative masses at a rapid, substantially uniform rate, that the reaction products be continuously quenched by and during contact with regenerative masses at a rapid, substantially uniform rate, that the preheated material be continuously, selectively and completely reacted to obtain the desired product as fast as possible immediately upon reacting reaction temperatures; that the reaction products be continuously quenched as soon as possible after the desired reaction occurs to prevent the reaction products from remaining at reaction temperatures for more than the amount of time required for completion of the desired reaction; that once the proper size and location and correct temperature of the reaction zone is determined to assure the correct residence time therein of reactants at proper temperatures for any particular reaction, that such reaction zone size, location and temperature be maintained substantially fixed during continuous operation; and that the size, location and temperature gradient of the preheating and quenching zones remain substantially fixed during continuous operation to assure proper and uniform preheating and quenching.

Failure to observe these important conditions in the prior art resulting in low thermal efficiencies, low rates of production and many undesirable side reactions with consequent low yields, impure products and increased costs.

In order that the rates of preheating, quenching and reaction, during contact with the masses and reaction zone, be rapid and the periods between completion of preheating and beginning of reaction as well as between completion of reaction and beginning of quenching be short, the velocities of reactants and reaction products through the masses and reaction zone should be very great and the regenerative masses should be capable of continuously storing or giving up heat at a sufficient rate to adequately preheat and quench the reactants and reaction products during their short total contact times therewith without destroying the heat gradient across the length of each mass and hence the initial localities and size of the preheating, reaction and quenching zones and without causing the cool ends of the masses to be raised to or above those temperatures at which undesirable side reactions and decomposition of the desired product occur.

In order that the preheating and quenching during contact with the masses be substantially uniform, a uniform temperature gradient ranging from near atmospheric temperatures (75° C.–250° C.) to reaction temperatures should be constantly maintained across the length of each regenerative mass. If the heat gradient is non-uniform and the reactants are flowed cold directly into the reaction zone at reaction temperature, the heating and reaction is sporadic, uneven and thermally inefficient with resulting lowered yields and undesirable side reactions.

In order that the reaction products remain at reaction temperatures for as short a time as possible, the reaction zone should be constantly maintained at a minimum size for completion of the desired reaction. If the reaction zone enlarges during continuous thermal alteration and spreads into the preheating and quenching zones, reaction products remain at reaction temperatures too long and are inadequately quenched and reactants are inadequately preheated. If the reaction zone moves too far into the quenching zone decreasing the size thereof, there is inadequate quenching and too much preheating.

These important conditions are not continuously maintained in any of the prior art processes and apparatus of the type described above utilizing pebble beds, standard checkerbrick, tubes, and other regenerative mass designs, since at the high gas velocities required, the masses in the majority of cases are not capable of absorbing and giving up sufficient heat to effectively preheat and quench the reactants and reaction products respectively.

Even in those cases where the prior art regenerative furnaces are sufficiently long for the transfer of enough heat for preheating and quenching during first runs, the rate of heat transfer and heat storage capacity is insufficient to prevent the spreading out of the hottest portions of the masses to the cooler portions thereof after continuous operation, with resulting destruction of the original and essential heat gradient and hence the original localities and size of the preheating, reaction and quenching zones. The masses finally approach a constant temperature throughout, the original well-defined preheating and quenching zones disappear, the cool ends of the masses become hot, and the entire furnace becomes a reaction zone with resulting long periods during which the gases remain at reaction temperatures. The furnace then becomes inefficient and the flow of materials must be stopped in order to re-establish the original heat gradient, reaction zone and cool ends of the regenerative masses. Furthermore, the nonuniformity of heat transfer and storage in the masses of the prior art result in excessive spalling of refractory material with consequent interference in efficient furnace operation.

The present invention provides a highly efficient, economical and versatile refractory, regenerative combined endothermic and exothermic alteration process and/or apparatus of the type described above utilizing four regenerative masses for the vapor phase non-catalytic or catalytic production of various endothermic and exothermic reaction products, wherein heat is continuously absorbed and given up by the masses at a rate permitting the above-mentioned rapid and uniform rates of preheating, reaction and quenching of the reactants and reaction products when flowed in contact therewith at the required exceedingly fast velocities mentioned above, without destruction of the original and essential heat gradient established in the masses and hence the location and size of the preheating, reaction and quenching zones, without heating up the cool ends of the masses to temperatures at which undesirable side reactions occur and without spalling of the refractory material of the masses.

The present invention further provides such a process and/or apparatus as above for vapor phase catalytic and non-catalytic production of various gaseous endothermic and exothermic alteration products from gaseous starting materials including the production of heating gas from natural gas, low molecular weight hydrocarbons or petroleum hydrocarbons, unsaturates such as olefins and acetylenes from low molecular weight hydrocarbons, hydrazine from ammonia, sulfur from sulfur dioxide, air and natural gas, hydrogen from hydrocarbons, synthesis gases for Fischer-Tropsch syntheses and alcohol syntheses from hydrocarbons, steam, and $CO_2$, synthesis gases for the production of ammonia from hydrocarbon, steam and air, aromatic hydrocarbons such as benzene from paraffinic hydrocarbons (including cyclo-paraffins), dehydrogenation products from dehydrogenatable compounds, isomerization products from hydrocarbons, nitric oxide from air, hydrogen cyanide from hydrocarbons and ammonia, dehydration products from alcohols, cracked low molecular weight hydrocarbons from high molecular weight hydrocarbons capable of being cracked, carbon black from hydrocarbons and many other products obtained by the vapor phase endothermic alteration of various substances, in a purer and more desirable state, with greater thermal efficiencies, in greater yields, at a greater rate and at less cost than any similar known refractory, regenerative thermal alteration process and apparatus known heretofore.

The present invention further provides such a process and/or apparatus as above in which the major portion of the contributed sensible heat to the in-gas is derived from the sensible heat taken from the off-gas and stored in heat regenerative masses.

The present invention further provides a very versatile process and/or apparatus which, by slight and simple variations in operating procedures, may be utilized to produce a great number of different chemical products.

All of the above provisions are fulfilled according to the present invention by the use of a novel, pyrolytic, regenerative process and apparatus for thermally altering a gaseous starting material comprising: preheating the gaseous material to endothermic alteration temperatures by linearly flowing the same through a preheating zone comprising uninterrupted channels of a first regenerative mass progressively hotter in the direction of gas flow, endothermically altering said preheated gaseous material by flowing the same through an exothermic reaction and endothermic alteration zone, thereafter quenching the endothermically altered gaseous material by linearly flowing the same through a quenching zone comprising uninterrupted channels of a second regenerative mass progressively colder in the direction of gas flow, supplying the heat for preheating and endothermically altering the gaseous material by carrying out exothermic reaction in the exothermic reaction and endothermic alteration zone, at least a portion of such exothermic reaction being carried out simultaneously with the endothermic alteration, each of the reactants for such exothermic reaction being preheated before the exothermic reaction thereof, in separate preheating operations at least one of the same being so preheated by passage through the channels of the regenerative masses from the cooler to the hotter ends thereof, reaction products resulting from the exothermic reaction being quenched by flowing the same through the channels of said regenerative masses from the hotter to the cooler ends thereof, maintaining the temperature gradient across the ends of the regenerative masses sufficiently stable to maintain the locality, temperature and size of the preheating, reaction and quenching zones substantially fixed and the cool ends of the masses below decomposition temperature of the endothermically altered material by periodically changing the flow of gases through the channels of the regenerative masses and the combustion and endothermic alteration zone during said endothermic alteration and said exothermic reaction from one direction to the opposite direction and quantitatively controlling the flow of reactants, said channels in each of said regenerative masses being arranged in staggered rows, the volumetric ratio of channular void to solid regenerative material in each of said regenerative masses being not greater than about 1 to 3 and the period of residence of the gases in the channels of each regenerative mass and said exothermic reaction and endothermic alteration zone not exceeding about 0.5X second and about 0.2X second respectively, X representing the pressure in atmospheres absolute at which the process is carried out.

More specifically and preferentially, all of the above provisions are fulfilled according to the present invention by the use of a novel, pyrolytic regenerative process for thermally altering a first gaseous starting material comprising: preheating to exothermic reaction temperatures said first gaseous material and a second gaseous material capable of reacting exothermically therewith by linearly flowing said first gaseous material through uninterrupted channels of a first regenerative mass and simultaneously linearly flowing said second gaseous material through uninterrupted channels of a second regenerative mass, said first and second regenerative masses being progressively hotter in the direction of gas flow; simultaneously exothermically reacting a portion, but not all of, and endothermically altering the remainder of said preheated first gaseous material by flowing the same through an exothermic reaction and endothermic alteration zone, said exothermic reaction being controlled to supply all of the required heat for said endothermic alteration by quantitatively controlling the flow of said materials, quenching the gaseous products emerging from said exothermic reaction and endothermic alteration zone by linearly flowing part of the same through uninterrupted channels of a third regenerative mass and the remainder through uninterrupted channels of a fourth regenerative mass, said third and fourth regenerative masses being progressively cooler in the direction of gas flow, continuously maintaining the size, location and temperature of said exothermic reaction and endothermic alteration zone substantially fixed and the cool ends of said masses below the decomposition temperature of the thermally altered material by continuously reversing, at predetermined intervals, the linear flow of gases through the channels of said regenerative masses and said exothermic reaction and endothermic alteration zone and by quantitatively controlling the flow of said second gaseous material. The original temperature gradient and hence the locality, temperature, and size of the preheating, reaction and quenching zones remains substantially fixed even after continuous operation. The cool ends of the furnace remain below temperatures at which the endothermically altered gases are decomposed.

Although the furnaces and processes of the present invention can be used to carry out endothermic alterations by the utilization of alternating endothermic alteration and heating cycles, they are particularly adapted to carrying out non-catalytic and catalytic reforming of hydrocarbons in a most efficient manner by simultaneous, partial combustion of the same with an oxygen-containing gas and without the use of a separate heating step. By preheating separately a hydrocarbon with or without a diluent and an oxygen-containing gas by contact with two separate masses, mixing the two streams while in a highly preheated condition and introducing the mixture immediately into the catalyst or non-catalyst containing reaction zone, combustion and endothermic alteration occur simultaneously. Thereafter, the reaction products pass in parallel through two regenerative masses similar to those first described and give up their heat thereto. The flow is then reversed after an appropriate interval (½ to 3 minutes) and the process is repeated, thereby giving a continuous supply of reformed product gas and maintaining the temperature necessary for the process without supplying additional external heat.

Preferentially, sufficient air or other free oxygen-containing gas is utilized to render the process substantially isothermal and thereby continuous by effecting combustion of an adequate portion of the starting material to supply all the heat required for the simultaneous endothermic alteration of the remainder of the starting material and for the impartation to the regenerative masses in which the products are quenched, heat requisite to raise additional quantities of the gaseous starting material and free oxygen-containing gas mixture to ignition temperatures by passage therethrough during the reverse cycle. However, sufficient air can be utilized to effect simultaneous combustion of only a sufficient amount of the starting material to supply only a portion of the heat required for endothermic alteration of the remainder of such starting material, the remainder of such heat being supplied by an alternating heating cycle.

It is apparent that only a relatively small portion of the combustible starting material, normally not more than about 15% to about 40% thereof will be consumed by the limited combustion reaction which occurs when the process is carried out substantially isothermally and therefore continuously. The balance of the starting material will be efficiently endothermically altered by the heat released by such limited combustion. The sensible heat of the entire gas mixture undergoing treatment in the process will accordingly be raised to the flame temperature of the combustion reaction, which temperature is above that necessary to initiate endothermic reaction of the starting material. The sensible heat of the product gas is imparted to the regenerative masses in the quenching step, and is utilized to raise additional quantities of starting material to endothermic reaction temperatures.

It will be appreciated that the above described isothermal, partial combustion process differs radically from regenerative processes of the prior art. The prior art teaches that the regenerative masses employed to effect the desired endothermic reactions must be preheated to a temperature in excess of that required for such reactions. That is, in the processes of the prior art, regenerative masses are employed which are at least as hot as the product gases produced. The regenerative masses must supply the heat requisite not only to initiate but also to maintain the endothermic thermal alteration reactions. Such processes are necessarily attended by excessive heat loss, and therefore, are highly inefficient.

In contrast with such prior art processes, in carrying out the present invention the product gases, when produced, are substantially hotter than the regenerative masses and the walls of the reaction zone. That is, the regenerative masses are always at a temperature substantially lower than the maximum gas temperature. Furthermore, during the actual thermal alteration phase of the process, the endothermic and exothermic reactions are substantially in balance. Hence, there is no significant heat loss in the system. Operation at high temperature without serious adverse effect upon the refractory material of the regenerative masses is thus made possible.

In copending application Serial No. 154,185, a process is described in which the same general method of operation is shown wherein no catalyst is used, the hydrocarbon material and the oxygen-containing gas are premixed and two regenerative masses are utilized rather than the four regenerative masses of the present invention. In this case some of the partial combustion and reforming reactions occur in the checkers and completion of the reaction occurs in a central combustion chamber. While this is satisfactory and a very efficient way of reforming hydrocarbons with low ratios of air to hydrocarbon, it has been found that the present invention is more suitable for both catalytic and noncatalytic reforming to produce gases with high hydrogen content, utilizing higher air-hydrocarbon ratios. This is due to the fact that according to the present invention, as distinguished from that of application Serial No. 154,185, substantially all of the partial combustion and reforming reactions occur in the catalyst-containing or non-catalyst containing reaction zones and the regenerative sections serve merely for preheating of the feed and cooling of the product gases. Because of this more localized combustion, when higher air-H. C. ratios are used, there is even less of a tendency in the present case for the hottest portions of the regenerative sections to spread out than in the process and apparatus of application Serial No. 154,185. Thus, according to the present invention, when higher air-H. C. ratios are used, the size, location and temperature of the reaction zone may be even better controlled than in the processes and apparatus disclosed in application Serial No. 154,185.

The various embodiments of the processes and apparatus of the present invention can be utilized with a catalyst. That is, by placing, in the reaction zone, a vapor phase endothermic alteration catalyst appropriate for the particular endothermic alteration being carried out, and flowing the preheated gaseous mixture from the channels of two of the regenerative masses through the reaction zone in contact with such catalyst, catalytic endothermic alteration occurs. The catalytic material may be deposited in the reaction zone in any manner. For instance, the reaction zone may be filled with loosely packed granules or pebbles of catalytic material or the walls of the reaction zone may be impregnated with catalytic material. Loosely packed granules of catalyst completely filling the reaction zone are preferred.

Any catalytic material appropriate for the particular endothermic alteration desired can be utilized in the present invention such as dehydrogenation catalysts for dehydrogenation reactions, cyclization catalysts for cyclization of hydrocarbons to benzene, reforming catalysts for the preparation of heating gases from hydrocarbons such as natural gas, refinery gases, propane, fuel oil, gasoline or other liquid petroleum hydrocarbons which may be vaporized, hydrogen producing catalysts for production of hydrogen from hydrocarbons or the reaction of hydrocarbons and steam, and known catalysts for the production of hydrazine from ammonia, synthesis gases for the production of alcohols or hydrocarbons from $CO_2$, hydrocarbons and steam, synthesis gases for the production of ammonia from hydrocarbons, steam and air, acetylenes or olefins from hydrocarbons, hydrogen cyanide from low molecular weight hydrocarbons and ammonia, sulfur from sulfur dioxide, air and natural gas, etc.

It will be appreciated that the reaction temperatures, or temperatures of the gases to be attained in the reaction zone for any particular catalytic endothermic alteration, will depend on the particular catalytic material used. Temperatures known in the prior art to be appropriate for the particular catalytic material used in any particular endothermic alteration are also appropriate in that particular endothermic alteration carried out according to the present invention.

Even when the processes of the present invention are carried out non-catalytically, the reaction zone may be packed with inert packing material such as cores, Berl saddles, solid spheres or flated tiles, in order to increase contact area in the reaction zone.

It will be understood that the phrase "catalytic material" employed herein is embrasive of and generic to materials which effect catalytic action due to their particular chemical constitution and also to materials which are catalytically active as a consequence of surface phenomena for which they are responsible. In other words, the mass of catalytic material may be inert insofar as catalysis due to chemical composition is concerned, but effective solely as a consequence of the large amount of surface area exposed. The catalytic mass preferably takes the form of a particulate or pelleted material, metallic rings or cartridges, or it may be composed of layers of metallic screen of types commercially available.

The catalytic mass may be of several types as regards chemical and physical constitution, depending upon the type of reaction it is desired to carry out. For example, a nickel type catalyst alone or in combination with an alumina or magnesia carrier is preferred to carry out gas reforming reactions of the following type:

$$CH_4 + H_2O \rightarrow CO + 3H_2$$

$$CH_4 + CO_2 \rightarrow 2CO + 2H_2$$

Operations employing this type of reaction are effective for the production of heating or synthesis gas. Other catalysts that may be employed for this purpose include chromium, cobalt, iron, copper and silver and the various oxides and salts thereof and mixtures of the same, either alone or in combination with promoters or carriers such as aluminum oxide, magnesium oxide, etc.

Chromium oxide catalysts may be employed for carrying out dehydrogenation reactions of the following type:

$$C_4H_{10} \rightarrow C_4H_8$$
Butane   Butylene

Reactions such as those availed of in the reforming of natural gas, methane or higher hydrocarbons to produce heating gas or endothermic gas reaction products comprising unsaturated compounds and aromatics are preferably catalyzed with masses of surface active materials such as alumina, silicon carbide and magnesia.

Again it is stressed that other catalysts known in the art may equivalently be employed to effect reactions for which they are particularly appropriate in the processes of this invention.

It is to be understood that certain endothermic reactions may be carried out more efficiently according to the present invention by the use of catalysts whereas others are more efficiently carried out non-catalytically. The reforming of low molecular weight paraffins such as propane to produce a heating gas having properties allowing it to be substituted in utilities for natural gas may be carried out efficiently without a catalyst whereas the reforming of natural gas to a low B. t. u. heating gas for use by itself or in admixture with higher B. t. u. gases in utilities is carried out more efficiently with a catalyst.

However, most of the reactions may be carried out to some extent either catalytically or non-catalytically, the temperature of reaction varying accordingly. The use of a catalyst in the present invention has the advantage of permitting the use of lower temperatures in the reaction zone hence reducing the temperature differential between the reaction zone and the cooler ends of the masses and decreasing the tendency of the cooler ends of such masses to rise to temperatures at or above those temperatures at which the desired altered products are decomposed. It is apparent that catalysts can be used to best advantage in endothermic reactions requiring high endothermic alteration temperatures.

It will be understood that the refractory regenerative masses must be preheated prior to the initiation of the various processes of the invention to establish the proper temperature gradient therein. This preheating may be effected in any desired manner. Normally, the refractory regenerative furnaces employed are provided with heating means for the purpose. A desirable mode of operation entails heating the four mass regenerative furnace in a manner such that when a separate stream of gaseous fuel heated by passage through one of the masses and a separate stream of air or other free oxygen-containing gas heated by passage through another of the masses are intimately mixed, they will be ignited and thereafter burned in the reaction zone and the combustion gases passed through the other two masses, in parallel, the direction of gas flow through the furnace being continuously reversed.

Another mode of preheating the furnace is to burn a mixture of fuel gas and air or oxygen-containing gas in the middle of the furnace by means of burners located therein, part of the hot combustion gases produced passing through two masses in parallel to the stack and part through the other two masses in parallel to the stack. By either of these modes of preheat, the reaction zone and catalyst contained therein, when the process is carried out catalytically, is heated to a temperature of from about 1600° C. to 500° C. depending on the endothermic reaction to be carried out, whether it is to be carried out catalytically, and if so, the particular catalyst to be utilized. The design of the furnaces of the present invention is such that during such preheating the cooler ends of the masses remain at a temperature below that at which undesirable side reactions and decomposition of the desired altered products take place. These cooler ends, after preheating, are usually at temperatures of from about 75° C. to about 250° C. preferably 100° C. and the hotter ends are at temperatures somewhat below the temperature of the reaction zone.

These hotter ends of the regenerative mass should at least be at the ignition temperature of the mixture of hydrocarbons and oxygen-containing gas.

When the preferred high efficiency furnaces of this invention are employed, the cooler ends of the regenerative masses, even after continued operation, are normally at a temperature preferably within the range of 75° C. to 250° C., such temperatures, of course, similarly resulting from the preheating operation of the type previously described. Herein is one of the important contributions of the present invention, since in all similar less thermally efficient furnaces of the prior art these cooler ends of the regenerative masses after continuous operation tend to rise in temperature until they approach the temperature of the hotter ends of the masses, under which conditions the process can no longer be carried out, therefore necessitating the halting of the endothermic alteration process to re-establish the proper heat gradient.

It is additionally important to the success of the invention that low pressure drop, a high rate of heat transfer and short contact time with the regenerative masses and reaction zone be adhered to.

The maximum period of residence time of the gases undergoing treatment in each of the first and second regenerative masses depends on the particular endothermic alteration reaction and the temperature at which it is carried out. However, the time in each mass preferably should not exceed about $0.5x$ second where $x$ represents the pressure in absolute atmospheres at which the process is carried out. A preferred range for this residence period is from about $0.4x$ to about $0.05x$ second. In producing some heating gases rich in unsaturates, hydrazine and unsaturates, the residence period should not exceed about $0.3x$ second preferably being from about $0.05x$ second to about $0.1x$ second.

The residence period in the reaction zone of gases undergoing non-catalytic treatment should, preferably, not exceed about 0.2x second with a preferred range of from about 0.15x second to about 0.01x second. In producing some heating gases rich in unsaturates, hydrazine and unsaturates, this residence period should not exceed about 0.05x second, preferably being from about 0.01x second to about 0.03x second.

The process of the present invention may be carried out under sub-atmospheric or superatmospheric pressures. Sub-atmospheric pressure processes are preferably effected at from just below atmospheric pressure to about 0.2 atmosphere absolute and are particularly useful in the production of some heating gases rich in unsaturates, low molecular weight olefins from hydrocarbon, hydrazine from ammonia and acetylene from hydrocarbons. However, olefins and heating gases may be efficiently produced at atmospheric pressure. Although hydrazine and acetylene can be produced at atmospheric pressures, the use of subatmospheric pressures is much more satisfactory since they permit shorter preheat, reaction and quenching times thereby cutting down the amount of side reactions and decomposition of the desired product.

A preferred pressure range for superatmospheric conditions such as those utilized for the production of higher olefins, aromatics and other liquid reaction products, is from about just above atmospheric pressure to about 5 atmospheres. However, pressures not exceeding about 3 atmospheres are very effective.

The higher pressures utilized in the production of aromatics and higher olefins result in longer residence times in the masses and reaction zone, which is permissible and desirable in such reactions.

When oxygen is utilized in lieu of air, the residence times of the gases undergoing treatment in the furnace may be reduced to about ½ of that required with similar operations conducted with air. Thus, the residence time at atmospheric pressure when oxygen is utilized may be reduced to a few thousandths of a second. It will be appreciated that analogous modifications in residence time may be effected when other gases richer or poorer in free oxygen than air are employed. To obviate the possibility of overloading the furnace when gases extremely rich in oxygen are employed, reduction in residence time is desirably effected by decreasing the pressures rather than by increasing the rate of feed.

It is obvious that the reduction of residence and quenching periods by the reduction in pressure in the system can be accomplished without appreciable change in pressure drop through the regenerative mass because only the lineal gas velocity is increased, not the mass velocity. This feature of restricted pressure drop constitutes one of the salient features of this invention. The pressure drop in the apparatus should not exceed about 5 pounds per square inch. A preferable range is from about 1 pound per square inch to about 2.0 pounds per square inch.

Diluents may or may not be used during endothermic alterations. In the production of acetylenes, olefins, heating gas and aromatics and in dehydrogenation, cracking and isomerization of hydrocarbons, steam is useful as a diluent. In the production of hydrogen, hydrazine and carbon black, hydrogen is useful as a diluent. Known prior art diluents may be utilized for each particular type of endothermic alteration.

Only so much oxygen or free oxygen-containing gas should be employed in the present process as is required to obtain the heat requisite for the production of the desired product and to the maintenance of the process.

Air, oxygen or oxygen in admixture with other gases such as nitrogen which are inert under the conditions of reaction may be employed. Air is preferred.

Speaking generally, air may be mixed with low molecular weight hydrocarbons for use in the partial combustion processes of the invention in the range in parts by volume of from about 0.5 part of air per part of hydrocarbon to about 6.5 parts of air per part of hydrocarbon for hydrocarbons from methane through pentane. Similar ratios for oxygen are from about 0.1 part of oxygen per part of hydrocarbon to about 1.5 parts of oxygen per part of hydrocarbon. When cracking hydrocarbons higher than pentane, proportionately larger amounts of oxygen are required. In general, the maximum required is approximately the same number of oxygen atoms as there are carbon atoms in the molecule. Those skilled in the art will readily be able to determine the proper proportions of free oxygen-containing gas to employ with starting material other than hydrocarbons.

In those cases wherein only a portion of the endothermic heat of alteration is supplied by simultaneous combustion, the remainder being supplied by an alternating heating step, the ratio of air or oxygen to combustible material, e. g. hydrocarbon, will be lower.

As has been discussed, the temperatures of the hottest portions of the masses during operation are at least equal to the ignition temperatures of the preheated mixture of starting material and oxygen-containing gas. The walls of the reaction zone and the catalyst material when used are usually somewhat hotter than the hottest portion of the masses. Gas temperatures within the reaction zone are considerably higher than reaction zone wall temperatures. These temperatures of course will vary according to the particular endothermic alteration being carried out, whether the alteration is catalytic and if so, the particular catalyst used. In certain reactions carried out catalytically, the catalyst and walls of the reaction zone are at a lower temperature than the hottest portions of the masses.

The required temperatures for particular endothermic alterations without the use of catalysts and with the use of particular prior art catalysts are well known in the art. When producing heating gases from low molecular weight hydrocarbons, temperatures in the reaction zone range from about 700° C. to 1000° C.

In the specification and claims, the terms "gaseous material" and "gases" refer to both normally gaseous material and materials such as liquids and solids not normally gaseous but capable of existing as a vapor or of being suspended in a gaseous media such as powdered coal or atomized oil. Low molecular weight compounds such as methane, ethane and the various isomeric and normal propanes, butanes, hexanes and mixtures thereof may be employed, as well as the octanes and decanes and petroleum naphtha. Such "gaseous materials" include ammonia, mixtures of hydrocarbon and ammonia, air, carbon dioxide, steam, sulfur dioxide, powdered coal suspended in oxygen, air or steam or in a mixture of two or more of the same, etc.

Liquid hydrocarbons such as fuel oil and natural gasoline may be preheated or atomized and introduced with air.

The provision of a novel regenerative furnace structure in which the processes of the present invention may be carried out is one of the primary features of this invention. Briefly stated, the furnace structure of this invention includes four heat insulated regenerative masses each having linear, continuous flues passing therethrough, each of such regenerative masses being provided with a free space in communication with one extremity of the flues and a heat insulated reaction zone communicating between the extremities of the flues of each of the regenerative masses opposite the free spaces. Means are associated with each of the free spaces for the admission and discharge of gases thereto and therefrom. Means for reversing the direction of the flow of gases through the furnaces are also included. The reaction zone may or may not have a catalytic or non-catalytic material present therein preferably in the form of particulate pellets.

In one embodiment of such a furnace, the four masses comprise two pairs of masses with a mixing chamber communicating between the extremities of the flues of each pair of masses opposite the free spaces and the reaction zone whereby gases passing from the free spaces of such pair of masses to the free spaces of the other pair of masses pass through the flues of one pair of masses thence through its mixing chamber, thence through the reaction zone, thence through the mixing chamber of the other pair of masses and thence through the flues of the other pair of masses. Burner means are included for admitting fuel gases to each of the mixing chambers.

Each pair of masses may be on opposite sides of the reaction zone, the flues in each mass of one pair of masses being axially aligned with the flues of one of the masses of the other pair of masses, or both pairs of masses may be side by side on the same side of the reaction zone, the flues of each mass being parallel with the flues of the other masses, or the four masses may extend from the reaction zone at any desired angle to each other.

The invention will be better understood by reference to the accompanying drawings:

Figure 6 shows partly in section and partly diagrammatically a second preferred embodiment of the present invention.

Figure 7 is a cross section on a plane represented by line VII—VII of Figure 6.

Figure 8 is a cross section on a plane represented by line VIII—VIII of Figure 6.

Figure 9 is a cross section on a plane represented by a line IX—IX of Figure 6.

Figure 10 is a cross section on a plane represented by line X—X of Figure 6.

Figure 1:
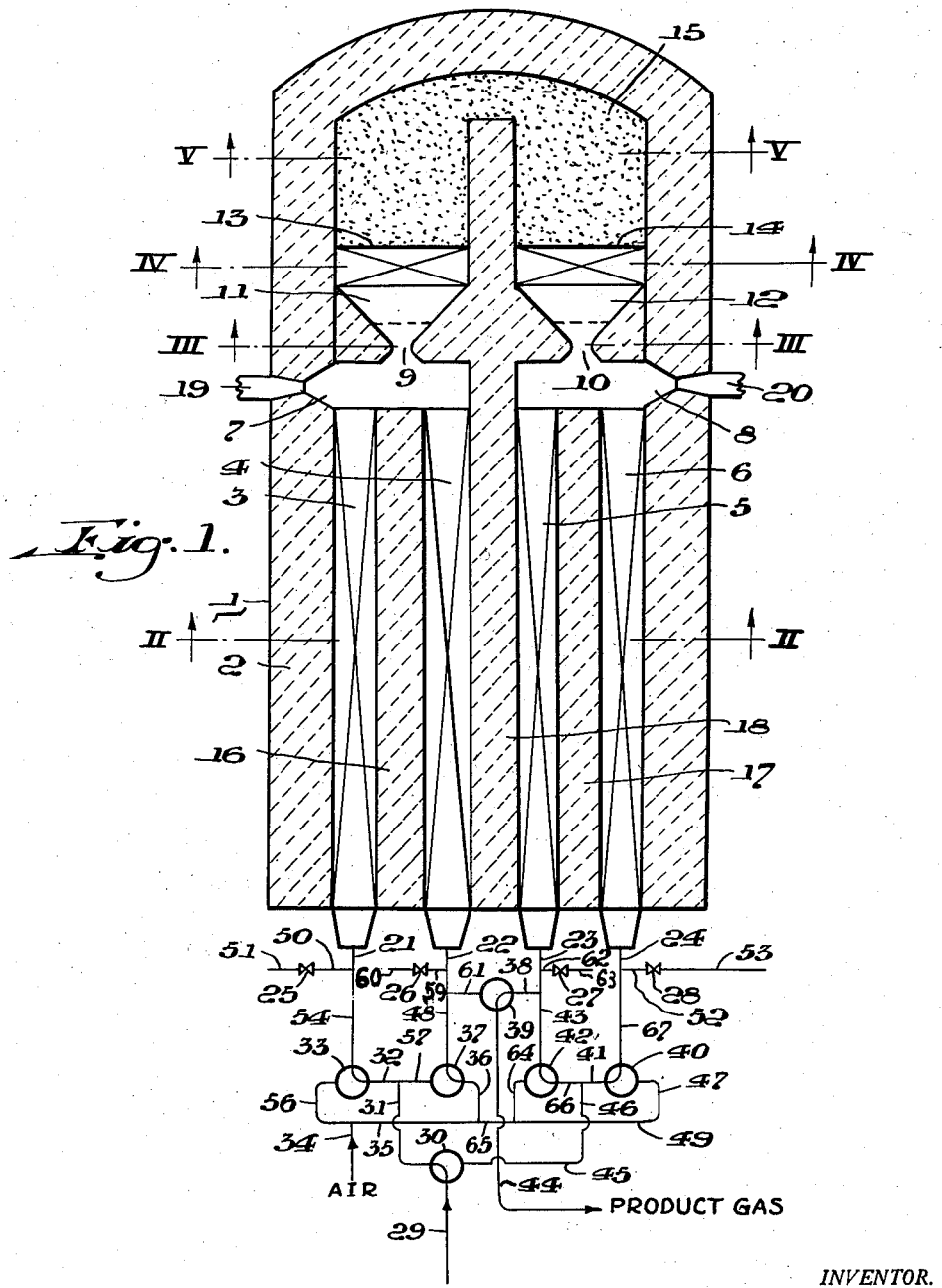
Figure 1 shows partly in section partly diagrammatically, a complete apparatus in accordance with the present invention.

While Figure 1 shows the general arrangement of four vertical regenerative masses separated in two pairs by a central bridge wall, each pair being connected to a central reaction chamber containing a catalyst, a venturi mixer, a distribution chamber and a distribution grid, it is obvious that this arrangement may be either vertical, at any angle, or horizontal although the last is preferred because of ease in construction, stacking of checkers, maintenance, and charging and discharging catalyst. Furthermore a reaction chamber can be employed without a catalyst.

Furthermore, while Figure 6 shows a horizontal furnace, it is obvious that it may be vertical or at any angle.

Referring to Figures 1–5, the furnace consists of a gastight shell 1 containing a refractory lining 2 and four regenerative masses 3, 4, 5, and 6. Masses 3, 4, 5, and 6 terminate within the furnace in passageways 7 and 8 which in turn connect with venturi throats 9 and 10 leading to chambers 11 and 12 which in turn connect with checker sections 13 and 14. The latter in turn connect with chamber 15 which may or may not contain a catalytic mass. In the figure a catalytic mass is disclosed. Bridge wall 16 separates regenerative masses 3 and 4 while bridge wall 17 separates regenerative masses 5 and 6. A central bridge wall 18 in turn separates regenerative masses 4 and 5 and chambers 7 and 8. An extension thereof separates venturi throats 9 and 10, chambers 11 and 12, and checker sections 13 and 14 and a further extension produces a U-shaped reaction chamber 15.

Burners 19 and 20 connected with passageways 7 and 8 are used in the initial step of preheating the furnace to a temperature suitable for operation of the process. Pipe connections 21, 22, 23, and 24 connecting respectively with regenerative masses 3, 4, 5 and 6 serve for introduction and withdrawal of gas streams into and from the furnace.

Pipe 21 is connected through line 50, valve 25 and line 51 to a stack (not shown). Pipe 21 is also connected through line 54 to valve 33 which in turn is connected through line 56 and line 34 to a source of air. Pipe 21 is also connected through line 54, valve 33, line 32, line 31, valve 30 and line 29 to a source of hydrocarbon. Pipe 21 is also connected through line 54, valve 33, line 32, line 57, valve 37, line 48, line 61, valve 39 and line 44 to a product gas storage means (not shown).

Pipe 22 is connected through line 59, valve 26 and line 60 to a stack (not shown). Pipe 22 is also connected through line 48, valve 37 and lines 36, 35 and 34 to a source of air. Pipe 22 is also connected through line 48, valve 37, lines 57 and 31, valve 30 and line 29 to a source of hydrocarbon gas. Line 22 is also connected through line 61, valve 39 and line 44 to product gas storage.

Pipe 23 is connected through line 62, valve 27 and line 63 to a stack. Pipe 23 is also connected through line 43, valve 42 and lines 64, 65, 35 and 34 to a source of air. Pipe line 23 is also connected through line 43, valve 42, line 66, line 46, line 45, valve 30 and line 29 to a source of hydrocarbons. Pipe 23 is also connected through line 38, valve 39 and line 44 to product gas storage.

Pipe 24 is connected through line 52, valve 28 and line 53 to a stack. Pipe 24 is also connected through line 67, valve 40 and lines 47, 49, 65, 35 and 34 to a source of air. Pipe 24 is also connected through line 67, valve 40, lines 41, 46 and 45, valve 30 and line 29 to a source of hydrocarbon gas. Pipe 24 is also connected through line 67, valve 40, lines 41 and 66, valve 42, lines 43 and 38, valve 39 and line 44 to product gas storage.

Figure 2:
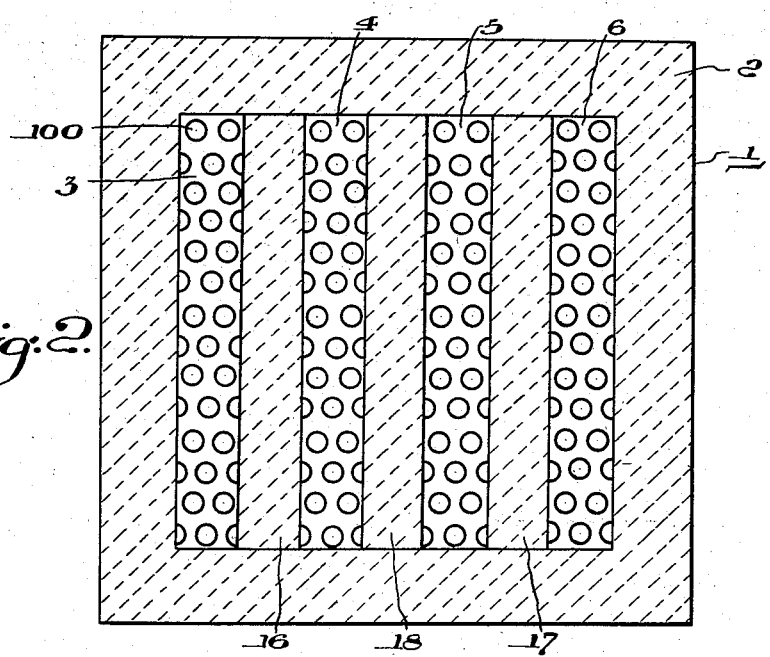
Figure 2 is a cross section on a plane represented by line II—II of Figure 1.

Figure 2 is a cross section on a plane along the line II—II of Figure 1 showing the four isolated and substantially gastight regenerative masses 3, 4, 5 and 6 bounded by refractory walls 16, 17 and 18. The masses contain flues 100, comprising uninterrupted passageways preferably of the type disclosed in my copending patent applications Serial Nos. 129,969, now abandoned, and 154,185.

Figure 3:
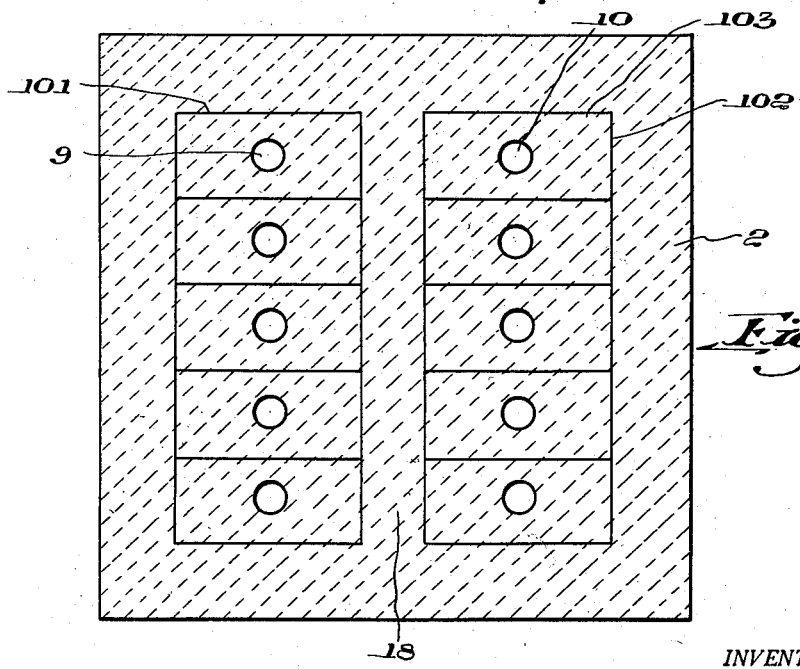
Figure 3 is a cross section on a plane represented by line III—III of Figure 1.

Figure 3 is a cross section on a plane along the line III—III of Figure 1 showing two passageways 101 and 102 bounded by substantially gas-tight refractory walls 18 and 2, each passageway having venturi throats 9 and 10 in venturi blocks 103 which serve alternately for mixing gas stream No. 1 and gas stream No. 2 which are discharged from the two separate preheating regenerative masses when such masses are utilized for gas preheating and for receiving the product gas from the reaction chamber and distributing said product gas between the two quenching masses when such masses are utilized for gas quenching.

Figure 4:
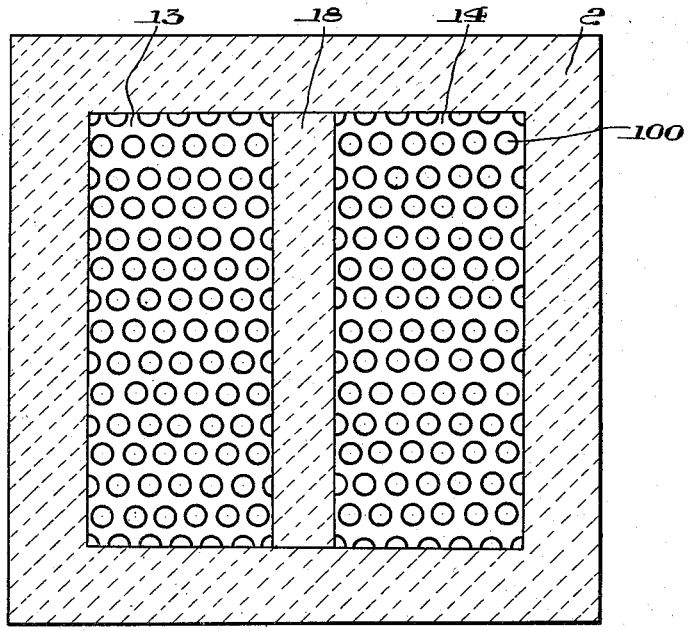
Figure 4 is a cross section on a plane represented by line IV—IV of Figure 1.

Figure 4 is a cross section on a plane along the line IV—IV of Figure 1 showing distribution means 13 and 14 which may take the form of grids composed of regenerative mass checkers of the type employed in the regenerative masses shown in Figure 2. However, such distribution means may be composed of heat resistant metal grids or layers of heat resistant metal screens. These distribution means or grids serve to isolate the chambers 11 and 12 from the reaction chamber 15 containing catalytic material.

Figure 5:
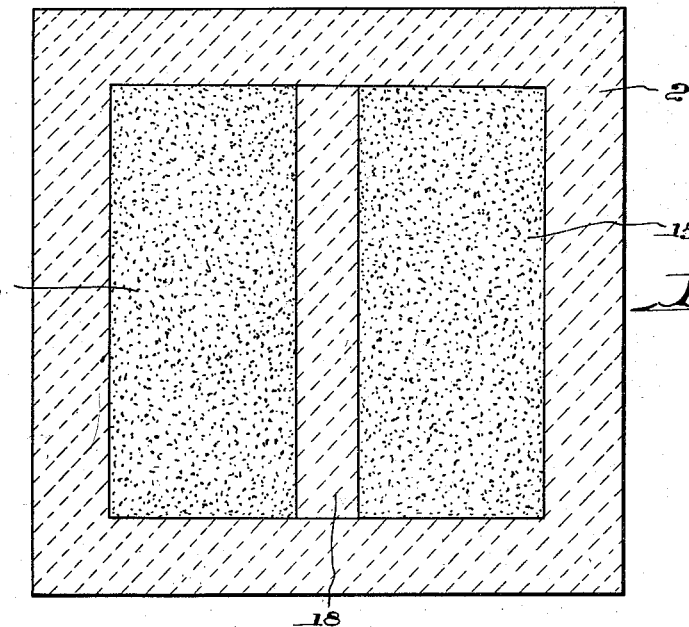
Figure 5 is a cross section on a plane represented by line V—V of Figure 1.

Figure 5 is a cross section on a plane along the line V—V of Figure 1 showing the two sections of catalyst containing or non catalyst-containing reaction chamber 15 separated by bridge wall 18.

The apparatus of Figures 6–10, yet another embodiment of the invention is similar to Figures 1–5 and like numerals are utilized to identify like elements. The only difference is that in the latter drawings checkerworks 3 and 4 and checkerworks 5 and 6 are on opposite sides of chamber 15 with the flues of mass 3 in axial alignment with the flues of mass 6 and the flues of mass 4 in axial alignment with the flues of mass 5. In such an apparatus, naturally, wall 18 of Figure 1 is not required.

Although the cross sections of the furnaces and of the refractory masses are preferably rectangular, as shown, they may be circular or any other shape desired.

It will be appreciated that in the preferred embodiment of the present invention disclosed in Figures 6–10, the hottest ends of the regenerative masses are in substantially abutting relationship. Heat loss by radiation is consequently greatly reduced. Furthermore, pressure drop of the gases undergoing treatment in the furnace is reduced inasmuch as the gases do not change direction in passing from one of the regenerative masses to the other. In addition there are many mechanical advantages inherent in this structure including simple provision for expansion and contraction of the apparatus.

Although the piping arrangement disclosed in the figures is arranged for the preferred process of the present invention wherein sufficient combustion is carried out simultaneously with reformation to supply all the heat of reformation, therefore dispensing with the need of a heat cycle, a different arrangement would obviously be required if an alternating heating cycle is to be used as is the case when there is no partial combustion during reformation or where there is some partial combustion carried out simultaneously with reformation but not enough to supply all the heat of reformation.

High heat transfer, short residence time and low pressure drop in the regenerative furnace are important to the successful practice of this invention. To this end, the particular furnace and regenerative mass structure embraced by this invention should preferably conform to certain structural limitations. The length of each regenerative mass should preferably not exceed about 15 ft. Likewise, regenerative masses less than about 4 ft. in length are impractical, although the lower limit is not necessarily critical. A preferred length for each of the regenerative masses is from about 6 to about 10 ft.

Likewise, in all cases, except some of those endothermic reactions which are carried out catalytically, the void volume of the reaction chamber of the furnace should preferably not exceed about 60% of the combined volume of the flues contained in the regenerative masses of the furnace. It is preferred in such cases that the volume of the reaction chamber be equal to from about 20% to about 40% of the combined volume of the flues. However, in some of the reactions carried out catalytically, the reaction zone volume may be as much as about 10 to 20 times greater than the combined volume of the flues.

The size of the reaction chamber varies according to the particular reaction being carried out. Generally, larger reaction chambers are utilized in those reactions requiring longer residence times in the reaction chamber or longer catalyst contact times.

Checkerworks 13 and 14 of the figures may comprise any form of grating rather than a checkerwork of the same design as checkerworks 3, 4, 5 and 6, although the latter is preferred.

The gas passageways or flues 100 in the masses 3, 4, 5 and 6 should preferably not exceed about 0.75 inch in maximum cross sectional distance or diameter. The lower limit of operable width or diameter of such flues is not necessarily critical, but must not be so small that excess pressure drop in the furnace occurs as a consequence thereof. Generally, flues of maximum width or diameter from about 0.75 inch to about 0.25 inch may be feasibly employed. Flues having a maximum width or diameter of about 0.375 inch to about 0.5 inch are preferred. The flues should preferably be substantially peripherally curved in cross section. They may be circular, elliptical or any shape in which a substantial portion of the peripheries are curved. Circular flues are preferred.

It is also desirable that the ratio of the volume of flues in the regenerative mass to the total volume of the regenerative mass in which the flues are located not exceed about 1:3. A preferable range for this ratio is from about 1:4 to about 1:10; and a suitable lower limit is about 1:20. The brick for use in the construction of the regenerative masses of the furnace of the invention may be prepared from any conventional refractory material such as various calcium, magnesium, aluminum, silicon, iron, chromium, etc. oxides and mixtures thereof. Furthermore, as a consequence of the thermodynamic advantages of the process of this invention, in the cooler portions of the regenerative masses, a checkerwork metal such as iron or copper or a checkerwork graphite may be employed. Preferably, the bricks are prepared from Carborundum or a material having a high alumina content such as fused alumina or Alundum to obtain maximum heat capacity, high refractoriness, high thermal stability and inertness toward the gases undergoing treatment.

There is a definite relationship between the spacings of the flues and the conductivity of the material. For example, with the iron, aluminum, copper or brass, the flues may be from about ⅜" to about ¾" in diameter and be peripherally spaced from about 1" to about 2" apart. In the case of Carborundum, the flues may be from about ¼" to about ¾" in diameter and be peripherally spaced apart from about 1" to about 1½". Where the material employed is alumina or Alundum, with a heat conductivity of about one-quarter that of Carborundum, the flues may have a diameter of from about ¼" to about ½" and be peripherally spaced apart from about ⅜" to about ⅝".

There is a relationship between the conductivity of material comprising the units and the peripheral spacing of the flues. The ratio of conductivity, in B. t. u. per square foot per inch per hour per degree Fahrenheit, to the distance between flues, expressed in inches, should preferably be greater than about 40.

It will be observed from the drawings that the flues are so disposed that they form substantially equally staggered rows, the distance from the center of each flue to the center of the next most closely adjoining flues in adjacent rows and in the same row being substantially uniform. In the furnace of this invention this center to center distance should preferably not exceed about one and one half inches. A preferable range for this distance is from about 0.62" to about 0.88". The thickness of the refractory walls separating the flues is substantially uniform and should not be greater than about 0.75". A preferable range for this maximum distance is about 0.37" to about 0.625". When these limits are observed, the previously defined limits with respect to the ratio of the volume of the flues in the masses to the total volume of the masses in which the flues are located will be complied with. The flues in the drawing are about ⅜" in diameter and the distance from the center of each flue to the center of the next closest adjoining flues is about ¾". Obvious variations in relative size and shape of the flues and interwall thicknesses are operable within the previous limits with respect to maximum slot size and volume. Conventional checkerworks of other types than those specifically described herein may be employed if the aforementioned limits are observed.

A particular appropriate type of checkerbrick for use in the construction of the regenerative checkerwork of the furnace of this invention is that described and claimed in copending application Serial No. 129,969, entitled Regenerative Packing Construction, filed November 29, 1949.

However, bricks other than those disclosed in the above patent application are satisfactory. For instance, bricks can be utilized having grooved opposite faces and passageways passing completely therethrough in the same direction as such grooves, which passageways are located between such grooved faces. In such case, aligned grooves in the assembled mass of bricks form part of the flues in the mass and longitudinally aligned passageways passing through the bricks form the remainder of such flues. Also, each of the masses may be in one piece with the passageways passing therethrough. However, in these latter cases, there is a greater tendency for spalling to occur, possibly due to stresses set up in the refractory during the formation of the passageways through the bricks or masses. Therefore, it is preferred to utilize masses having channels therethrough formed only from aligned grooves of adjacent assembled bricks, as disclosed in the above referred to patent application. The only important factor to be kept in mind is that when the bricks are assembled to form the regenerative masses, the size of, the shape of, the distance between and the arrangement of the passageways should conform with the aforesaid and following descriptions.

One of the important features of the present invention is the lack of lamp black accumulation on the flue walls with resulting clogging and decrease in efficiency. Furthermore, the reaction products, when producing, even at extremely high temperatures, heating gases, hydrogen cyanide, olefins and acetylene, contain less carbon particles as impurities than in any other known similar processes.

Another advantage of the present process is that by merely varying the amounts of starting material and air flowed into the furnace during the endothermic alteration and combustion phase, the temperatures attained in the reaction zone and the hottest portions of the furnace can be varied to produce different endothermic products.

The present invention is useful to carry out any regenerative pyrolytic endothermic or combined exothermic and endothermic alteration process wherein the reactants must be heated, reacted and quenched. Operation of the furnace and processes of the invention will be described by reference to Figures 1 and 5.

Preliminary to putting the furnace into cyclic operation it must be preheated. For this purpose burners 19 and 20 are provided, which are operated alternately. For example, in the beginning, valves 25 and 26 are closed and valves 27 and 28 are opened. Burner 19 is put into operation and combustion takes place in chamber 7. The combustion gases pass through venturi 9, thence through chamber 11 and distribution means 13, which may comprise flues formed from regenerative shapes and shown in cross section in Figure 4 which is a section on a plane represented by line IV—IV of Figure 1. The gas then passes through reaction chamber 15, which is U-shaped, and passes back through distribution means 14, chamber 12, venturi 10, chamber 8 and in parallel through regenerative masses 5 and 6 and thence out through pipes 23 and 62, valve 27 and line 63 and lines 24 and 52, valve 28 and line 53 to the stacks. During the operation just described, heat is supplied to raise the temperature of the reaction chamber 15 and the catalyst contained therein, when catalytic processes are being carried out, and the top of regenerative masses 5 and 6. After passage in this direction for a short time, the process is reversed. Burner 19 is shut and burner 20 is put into operation, closing valves 27 and 28 and opening valves 25 and 26. The hot combustion gases from chamber 8 then travel in the reverse direction through venturi 10, chamber 12, distribution means 14, through chamber 15, through distribution means 13, chamber 11, venturi 9, and chamber 7, and pass out in parallel through regenerative masses 3 and 4. They finally issue from the furnace through pipes 21 and 50, valve 25 and line 51 and pipes 22 and 59, valve 26 and line 60. In this operation further heat is added to the reaction chamber and the catalyst contained therein, and the top of checkers 3 and 4 are raised in temperature. The process is reversed alternately until the reaction chamber and catalyst contained therein is heated to a temperature in excess of about 700° C. preferably from about 900° C. to about 1300° C. and the end of the regenerative masses 3, 4, 5 and 6 adjacent to chambers 7 and 8 are at approximately the same or a somewhat lower temperature.

The heat transfer efficiency resultant from the construction and dimensions of the regenerative checkerworks 3, 4, 5 and 6, previously described, is such that the combustion gases continually leave the furnace at a temperature of about 75° C. to about 300° C. The temperature gradient in the regenerative masses of the furnace will level off from in excess of about 700° C. at their hot ends to substantially atmospheric temperatures (about 75° C. to about 300° C.) at the terminal ends of the furnace.

It will be understood that the preheating step is only used when starting up the furnace. After the furnace is adequately preheated, it is ready for operation to produce heating gases.

The complete operating cycle is preferably carried out in four periods of substantially equal length. However, the flow of the feed gases and product gases is continuous as will be understood by the following description. The direction of flow gases through the furnace is reversed at intervals of from one to three minutes. There are two separate streams of feed gas, the first gas being hydrocarbon with or without steam dilution and the second gas being air or oxygen-containing gas. These two gases pass up through the first pair of regenerative masses in separate channels and after passing through the reaction chamber and catalyst contained therein pass down in parallel through the other set of two regenerative masses. It is advantageous to introduce the first and second gases through a different regenerative mass every other time the flow is in a certain direction. This offers the advantage of burning any carbon which may be deposited from the first gas in the regenerative mass during the preheating thereof since the next time the flow is in that direction the gas streams are reversed and air or other oxygen-containing gas will burn out such carbon. Also the temperature in all of the four checkers is equalized and kept quite uniform in distribution.

The first step in the operating cycle will be described by reference to Figures 1–10. A first gas consisting of a hydrocarbon such as natural gas or petroleum hydrocarbons containing ethane, propane, butane, or olefins or mixtures thereof in the gaseous or vapor state is passed with or without a diluent such as steam through line 29 and three-way valve 30, thence through pipes 31 and 32, three-way valve 33 and lines 54 and 21 into the furnace and through the flues of regenerative mass 3. Simultaneously a second gas consisting of air or oxygen-containing gas is passed through pipes 34, 35 and 36, three-way valve 37 and lines 48 and 22 into the furnace and thence through the flues of regenerative mass 4. The first and second gases passing up through separate regenerative masses 3 and 4 are preheated to substantially the same temperature or considerably above the ignition temperature of the hydrocarbons and oxygen containing gas in the feed and join in chamber 7. They are thoroughly mixed by passing through venturi 9. Partial combustion of a portion of the hydrocarbon starts and continues to completion in passing through distribution means 13 and reaction chamber 15. Since there is a deficiency of oxygen, only a portion (15% to 40%) of the hydrocarbons will be burned. The balance of the hydrocarbon is efficiently cracked and reformed in the reaction chamber by the heat released by the aforementioned combustion reaction. The sensible heat of the entire gas mixture is raised to the flame temperature of combustion reaction. The volume of the reaction chamber is such that substantially complete partial combustion and reforming reactions occur therein and the reaction products pass out through distribution means 14, chamber 12, venturi 10, chamber 8 and thence in parallel through regenerative masses 5 and 6. The portion of the product gas, which has passed through regenerative mass 5 gives up substantially all of its heat thereto and passes out through pipe 23 at approximately 150° C. It then passes through pipe 38, three-way valve 39 and line 44 to the purification or distribution or storage system. The other portion of the product gas which has passed through regenerative mass 6 and gives up substantially all of its heat thereto leaves the furnace through pipe 24, at approximately 150° C. It then passes through line 67, three-way valve 40, pipes 41 and 66, thence through three-way valve 42, and pipe 43, mixes with the other portion of product gas in pipe 38 and passes through three-way valve 39 and pipe 44 to the purification or distribution or storage system.

The second step in the operation, in which the gases flow in reverse direction through the furnace, is initiated by throwing simultaneously three-way valves 30, 37, 39 and 40. The first gas consisting of hydrocarbon with or without diluent enters through pipe 29, three-way valve 30, thence through pipes 45, 46 and 66, three-way valve 42 and lines 43 and 23 into the furnace and thence into regenerative mass 5. Simultaneously air enters through pipes 34, 35, 65, 49 and 47, three-way valve 40 and lines 67 and 24 into the furnace and thence through regenerative mass 6. As in the first operation the two streams pass separately from the colder to the hotter end of the regenerative masses and are preheated substantially above the ignition temperature of the hydrocarbon. The two streams join in chamber 8 and mix by passing through venturi throat 10. The mixed gases thence pass through chamber 12 and distribution means 14 and then pass through reaction chamber 15 where reforming and partial combustion reactions are completed. The product gas then leaves reaction chamber 15 through venturi throat 9 and chamber 7 where the streams split and pass in parallel through masses 3 and 4. The portion of product gas which passes from the hot to the cold end of the regenerative mass 3 thereby giving up its heat thereto, leaves the furnace through pipes 21 and 54, three-way valve 33, pipes 32 and 57, three-way valve 37, pipes 48 and 61, three-way valve 39 and pipe 44 to the purification or distribution or storage system. Likewise the other portion of the product gas passing from the hot to the cold end of the regenerative mass 4 passes from the furnace through pipe 22 joining the other portion of product gas in line 61 and finally passing out through three-way valve 39 and pipe 44 to the purification or distribution or storage system.

The third step in the operating cycle is actuated by a simultaneous throwing of three-way valves 30, 33, 39, and 40. The flow of the gas streams through the furnace is in the same direction as in the first step, that is from left to right. The only difference being that the air now flows through regenerative mass 3 through which gas and steam flowed in the first step. The air will burn out any carbon that may have deposited in the checkers in step 1 due to the direct pyrolysis of the hydrocarbon. Hydrocarbon and steam pass through regenerative mass 4 through which air was passed in the first step. Heat withdrawal by the two streams is somewhat different. Hence, if they are alternated it balances any inequality in the regenerative mass temperatures. Otherwise, the operation is the same as the first step in that the two streams are separately pre-heated in masses 3 and 4, are mixed in venturi 9, are burned and reformed in reaction chamber 15 and the product gas passes in parallel through the masses 5 and 6 thereby giving up substantially all of its sensible heat to such masses and finally out through three-way valves 40, 42, and 39 to the gas purification or storage equipment.

The fourth and final step of operating the apparatus and process is accomplished by simultaneously throwing valves 30, 33, 39 and 42. The flow of the gas is similar to step 2 except that the air flows through mass 5 while in step 2 the hydrocarbon and steam passed through this mass. Conversely gas and steam pass through mass 6 through which air passed in step 2. Otherwise the flow is the same. The two streams join in chamber 8, mix in venturi throat 10, pass through chamber 12, and thence through distribution means 14, and pass through reaction chamber 15 where reforming and partial combustion reactions are completed. The product gases then pass through distribution means 13, chamber 11, venturi 9, chamber 7 and pass in parallel streams through regenerative masses 3 and 4. Both streams leave the furnace through pipes 21 and 22, join in pipe 61, pass through three-way valve 39, and out through pipe 44 to the purification or distribution or storage system.

While operation with a four-step cycle, as described above, is preferable, it should be pointed out that the furnaces of the present invention can also be operated in different ways. For example, a two-step cycle can be carried out as follows: step 1 is followed by step 2, to be followed again by step 1, etc. This is quite satisfactory when reforming with low air or oxygen to hydrocarbon ratio, since under these conditions, temperatures are comparatively moderate and no carbon is formed in the regenerative masses.

The gas product obtained when a nickel catalyst is used and natural gas and air in a volumetric ratio of one of gas to two of air is fed to the furnace as heretofore described has the following composition:

| | |
|---|---|
| Carbon dioxide | 2.4 |
| Illuminants | 0.2 |
| Carbon monoxide | 15.4 |
| Hydrogen | 36.0 |
| Oxygen | 0.2 |
| Methane | 6.0 |
| Nitrogen | 39.8 |

By changing the ratio of air to gas, the depth of reforming and consequently the composition of the product gas can be varied. As has been stated, in producing heating gases the range for natural gas is about 1.5 to 3 volumes of air to one of natural gas.

After continuous operation, the cool ends of the masses do not rise appreciably in temperature but rather remain at substantially the same temperature as during initial operation. The location and size and temperature of the preheat, quench and reaction zones remain substantially fixed even after many hours of operation. By "preheat, reaction and quenching zones" it is meant those zones in the furnace at a temperature at which preheat, reaction and quenching occur. By "substantially fixed" it is not meant that the location and size of the various zones are constant but that they remain sufficiently fixed so that the greater part of the reaction zone is at all times coincidental with the reaction chamber 15, and the preheat and quench zones are at all times sufficiently large to effectively preheat and quench the gases passing therethrough.

The operation of the furnace in the manner above described is particularly advantageous in that no reheating, relocation or condensation of heating zones in the regenerative mass is required other than that resulting from the reversal of gas flow herein discussed. Furthermore, the absence of rapid and extreme temperature changes greatly prolongs the life of the regenerative checkerwork and thereby effects substantial economy. The above mode of operation at atmospheric pressures while admirably suited to the production of heating gas is not as well adapted to the production of acetylene in high yields as when subatmospheric pressures are utilized for the reason that the use of subatmospheric pressures permits a more rapid quenching which is necessary to prevent decomposition of the product.

Operation at subatmospheric pressure may be effected by any well known means. For instance a pump may be inserted in line 44. The apparatus is otherwise operated in the same manner as that previously described for operation at atmospheric pressure. Such reduced pressure operations are particularly suitable for the production of acetylene, hydrazine and other products requiring rapid quenching to prevent decomposition, for the reason that the residence time of the gases undergoing treatment in the refractory regenerative furnace can be reduced in proportion to the reduction in pressure below atmospheric.

Different and smaller ratios of hydrocarbon to air are employed when it is desired to produce acetylene than when heating gas is the desired product.

When reacting natural gas and air as described above to produce acetylene, the acetylene is not appreciably contaminated with carbon particles. Hence the difficulties of separation of carbon from the product acetylene is largely obviated.

Operation at superatmospheric pressures may be effected by inserting pumps in line 29 and 34 for raising the reactants to whatever pressure is desired.

If no catalyst is employed in a similar process, a product gas is obtained containing a higher proportion of unsaturates and a smaller proportion of hydrogen, inasmuch as a portion of the hydrogen produced is consumed by the combustion reactions. When nickel is employed, the steam forming in the combustion reaction and in the burning of hydrogen to form water catalytically reacts with the methane to form carbon monoxide and additional hydrogen.

High yields of heating gas are obtained by the use of nickel or nickel oxide with aluminum oxide or magnesium oxide carriers and promoters.

The use of steam with the air and hydrocarbon results in a high hydrogen containing product gas.

It is within the scope of the present invention but not a preferred embodiment thereof to carry out the processes of such invention by the use of only two masses on opposite sides of the reaction chamber, wherein only one of the gases (gaseous starting material or oxygen containing gas) is preheated by passage through one of the masses, the other gas being preheated by other means or not preheated at all and then admixed with the preheated first gas before its passage into the reaction chamber. The reaction products are then quenched by passage through the second mass.

Thereafter, the flow of gases is reversed, one of the gases being preheated by passage through the second mass, and the other gas, preheated by other means or not preheated, being admixed with the first preheated gas before its passage into the reaction chamber. This reversal of gas flow is continuously repeated as described above in discussing the preferred four mass embodiment of the present invention.

Although the preferred embodiment of the present invention, wherein sufficient oxygen is utilized to supply all the heat of reformation, has been particularly described above, the furnaces of the present invention can be operated with the use of only sufficient oxygen during simultaneous endothermic alteration and combustion to supply only a portion of the required heat of reformation, the remainder of such heat being supplied by a heat step. The endothermic alteration-combustion step would be the same as described in discussing those processes wherein all the heat of reformation is supplied by simultaneous combustion except for the use of lesser amounts of air or oxygen. That is, the gaseous starting material is preheated by passage through checker 3, air or oxygen being preheated simultaneously by passage through checker 4. The preheated gases are then mixed in chambers 7 and 11 and venturi 9, reacted in chamber 15 and the reaction products are then quenched by passage in parallel through checkers 5 and 6.

Since there is sufficient burning to supply only a portion of the required heat of reformation, the remainder of such heat is absorbed from the hottest portions of the checkers, the walls of the reaction chamber and the catalyst contained in the reaction chamber, resulting in a cooling thereof. This heat absorbed from the checkers and the reaction chamber must be replaced by a heating step following, and alternate with, the endothermic alteration step. Such heating step is carried out by preheating a gaseous fuel, which may be either the same as the gaseous starting material utilized during the endothermic alteration step or different, by passage of the same through checker 5 while simultaneously preheating sufficient free oxygen containing gas such as air by passage through checker 6 to completely burn such preheated gaseous fuel in reaction chamber 15 after being admixed therewith in chamber 8, venturi 10 and distribution means 14. The combustion gases issuing from reaction chamber 15 are quenched by passage through checkers 3 and 4 and are finally passed to the stacks. This heating step is followed by a second endothermic alteration combustion step, wherein the gaseous material is preheated in checker 4 and the free oxygen containing gas is preheated in checker 3, the reaction products being quenched in checkers 5 and 6. The latter endothermic alteration step is followed by another heat cycle wherein the gaseous fuel is preheated in checker 6 and air is preheated in checker 5. Thereafter the above steps are continuously repeated in the order described.

This latter process can be carried out without alternating the checkers through which the air, gaseous starting material, and gaseous fuel pass during each succeeding endothermic alteration-combustion step and each succeeding heating step. The result would be a two-phase cycle rather than a four-phase cycle.

Furthermore, this process can be carried out in such a manner that the direction of gas flow through the furnace is changed during each succeeding heating step and each succeeding endothermic alteration-combustion step. This results in a four-step cycle having an endothermic alteration-combustion step in one direction, followed by a heating step in a reverse direction, followed by an endothermic alteration-combustion step in such reverse direction, followed by a heat cycle in such one direction. Thereafter, the four step cycle is continuously repeated.

The required arrangements of pipes and valves to carry out the above process are not described since such arrangements are believed to be obvious to those skilled in the art.

The least preferred manner of utilizing the furnaces of the present invention involves a make and heat four-step cycle wherein there is no burning during endothermic alteration.

A heating step as described above is carried out utilizing checker 5 for preheating fuel and checker 6 for preheating air and checkers 3 and 4 for quenching the combustion products. This heating step is followed by an endothermic alteration step comprising preheating the gaseous starting material by passing the same alone, or admixed with a diluent such as steam, in parallel through checkers 3 and 4 and quenching the endothermically altered products issuing from the reaction zone by passing the same through checkers 5 and 6. Thereafter, the heating step is repeated except that fuel is preheated in checker 6 and air is preheated in checker 5. The endothermic alteration step is then carried out again and thereafter the cycle is continuously repeated.

This make and heat process can be carried out in 2 steps if it is not desired to alternate the checkers through which the air and fuel pass during each succeeding heat cycle, the endothermic alteration step being carried out with gas flow in one direction followed by the heating step carried out with gas flow in a reverse direction.

Furthermore, if desired, the direction of gas flow through the furnace may be reversed during each succeeding heating step and each succeeding endothermic alteration step.

The required arrangement of pipes and valves to carry out the make and heat processes is not described since such arrangements are believed to be obvious to those skilled in the art.

Whenever a separate heating step is utilized in the present invention, the flammable mixture of gaseous fuel and air may be preheated during such heating step by passing only one component of the same, preferably the fuel gas, through a regenerative mass such as checker 5 or 6, the other component, preheated by other means or not preheated at all, being admixed therewith before it passes into the reaction chamber 15.

While the processes of this invention have been described particularly with reference to the novel refractory regenerative furnaces as described herein which are particularly adapted thereto, these new processes may be practiced in other types of suitable apparatus.

The processes of this invention make it possible for the first time to produce various known endothermic gas reactions catalytically or non-catalytically in a highly efficient regenerative manner and to produce better yields of more desirable products in a more simple manner than is possible by any method known to the prior art.

Although an attempt has been made to explain the plausible theoretical basis for the unexpected results obtained by the present invention, the invention should not be limited to such theory.

It will be obvious to those skilled in the art that various modifications can be made in the several parts of the present apparatus and the several steps of the present process in addition to those enumerated herein above without departing from the spirit of the present invention and it is intended to cover in the claims such modifications as are included in the scope thereof.

I claim:

1. A furnace adapted to the thermal conversion of gaseous reactants comprising in combination a heat insulating shell, two pairs of regenerative masses communicatively connected one pair with the other pair and located within said shell, a reaction chamber located within said shell intermediate the communicating ends of said pairs of regenerative masses, said reaction chamber being communicatively connected to each pair of regenerative masses through a mixing device comprising a mass of material having a plurality of passages passing therethrough and through a mixing chamber of a restricted cross section, the limits of said reaction chamber being defined by the mass of material of each mixing device and by said insulating shell said regenerative masses having a plurality of substantially straight uninterrupted unobstructed flues passing therethrough, said flues having a maximum free cross-sectional distance not greater than 0.75 in. and the ratio of the total volume of the flues in each regenerative mass to the total volume of the mass in which said flues are located not exceding 1:3, said flues being arranged in staggered rows, each of said flues in each row being substantially equidistantly spaced from the two closest flues in each adjacent row and the two closest flues in the same row.

2. The furnace of claim 1 in which the ratio of the total volume of the flues in each regenerative mass to the total volume of the mass in which said flues are located is from 1:4 to 1:10.

3. The furnace of claim 1 in which a catalytic material is contained in the reaction chamber.

4. The furnace of claim 1 in which the peripheral spacing of the flues is no greater than 1.5 in.

5. The furnace of claim 4 in which each regenerative mass comprises alumina, the flues have a cross-sectional dimension of ¼ to ½ in. and the peripheral spacing of the flues is from ⅜ to ⅝ in.

6. The furnace of claim 5 in which a catalytic material is contained in the reaction chamber.

7. A furnace adapted to the thermal conversion of gaseous reactants comprising in combination a heat-insulating shell, two pairs of regenerative masses communicatively connected one pair with the other pair and located within said shell, a reaction chamber located within said shell intermediate the communicating ends of said pairs of regenerative masses, said reaction chamber being communicatively connected to each pair of regenerative masses through a mixing device comprising a mass of material having a plurality of passages passing therethrough and through a mixing chamber of restricted cross section, the limits of said reaction chamber being defined by the mass of material of each mixing device and by said insulating shell, said regenerative masses having a plurality of substantially straight, uninterrupted, unobstructed flues passing therethrough, said flues having a maximum free cross-sectional distance not greater than 0.75 in. and the ratio of the total volume of the flues in each regenerative mass to the total volume of the mass in which said flues are located not exceeding 1:3.

8. The furnace of claim 6 in which the passages of the mixing device have a maximum free cross-sectional distance not exceeding 0.75 in.

9. The furnace of claim 8 in which a catalyst is disposed in the reaction chamber.

References Cited in the file of this patent

UNITED STATES PATENTS

| | | |
|---|---|---|
| 1,873,941 | Hillebrand | Aug. 23, 1932 |
| 1,901,136 | Wilcox | Mar. 14, 1933 |
| 1,995,136 | Winkler | Mar. 19, 1935 |
| 2,232,121 | Linder | Feb. 18, 1941 |
| 2,313,157 | Linder | Mar. 9, 1943 |
| 2,421,744 | Daniels et al. | June 10, 1947 |
| 2,431,632 | Brandt | Nov. 25, 1947 |
| 2,491,518 | Riblett | Dec. 20, 1949 |
| 2,512,259 | Pike | June 20, 1950 |
| 2,550,742 | Welty | May 1, 1951 |
| 2,552,277 | Hasche | May 8, 1951 |
| 2,556,835 | Barr | June 12, 1951 |

FOREIGN PATENTS

| | | |
|---|---|---|
| 144,043 | Germany | Sept. 23, 1903 |